Sept. 29, 1942.   B. H. STAATS   2,297,082
VALVE
Filed Dec. 13, 1940
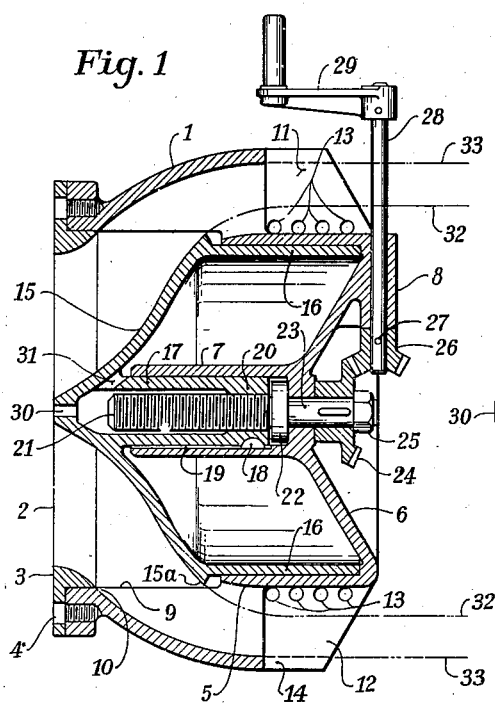
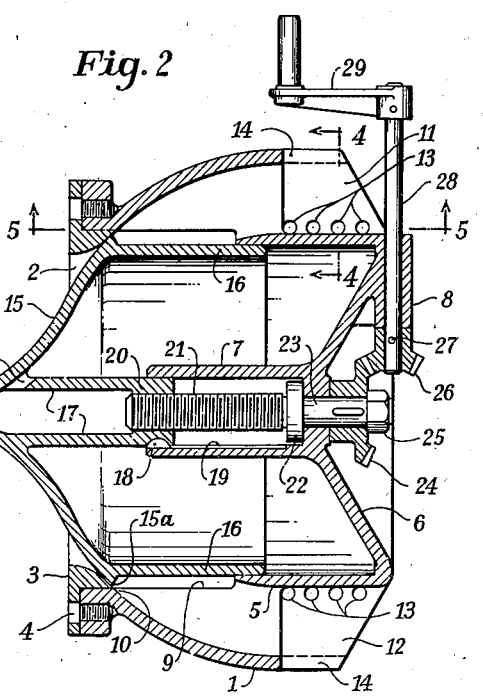
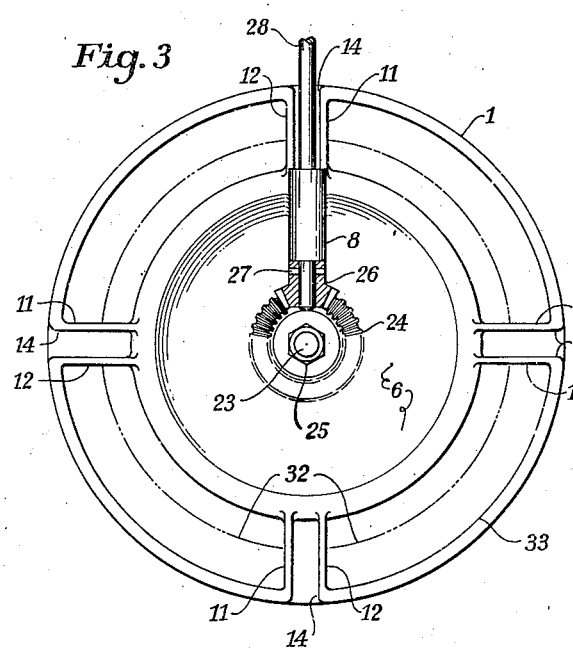
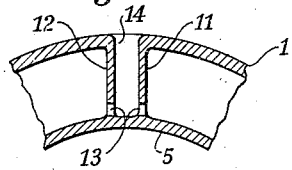
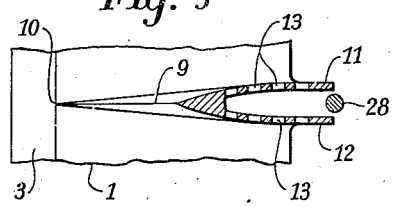
INVENTOR.
Byron H. Staats
BY WHITEHEAD & VOGL
Per Earle Whitehead
ATTORNEYS.

Patented Sept. 29, 1942

2,297,082

UNITED STATES PATENT OFFICE 2,297,082

VALVE

Byron H. Staats, Denver, Colo., assignor of one-half to Grover J. Hornsby, Denver, Colo.

Application December 13, 1940, Serial No. 369,941

14 Claims. (Cl. 299—144)

This invention relates to regulating or control valves, primarily those of large diameters adapted for operation under high pressures but not limited thereto.

Objects of the invention are to provide for the control of the flow of fluid through a valve casing, including the spreading of the fluid into, and maintaining it in, a substantially tubular stream surrounding a substantially annular air space; to provide for the emission of such fluid from the casing in a substantially tubular but segmental stream or jet; to provide in a valve for the admission of air to the interior of a substantially tubular stream without the valve as well as within, either or both; to eliminate cavitation in such a structure; to provide a valve, having a substantially annular passageway for the flow of fluid between a casing and a valve-carrying core, through which the liquid shall flow in a substantially tubular stream, annularly spaced from the core, without causing cavitation; to provide improved means for admission of air to the interior of a substantially tubular stream; to provide a structure which shall accomplish the said objects and still be simple and economical in construction, operation and maintenance and, by reason of its construction according to this invention, shall be extremely durable under use.

The foregoing and other objects will more fully hereinafter appear and, with a view of accomplishing such objects, the invention comprises certain novel constructions, combinations and arrangements of parts, as will be described and claimed and as illustrated in the accompanying drawing in which—

Fig. 1 is a central longitudinal section of a valve structure embodying this invention, with valve open, some parts being shown in elevation, and the flow of fluid through and from the structure being indicated.

Fig. 2 is a section like Fig. 1 except that the valve is shown closed.

Fig. 3 is an outlet-end elevation of the valve structure illustrated at Figs. 1 and 2.

Fig. 4 is a fragmentary section on line 4—4 of Fig. 2, and

Fig. 5 is a fragmentary section on line 5—5 of Fig. 2.

The invention is illustrated in the drawing in the preferred embodiment which will be now described. Much of the structure illustrated, however, is wholly optional and may be varied as desired so far as concerns the invention. For example, many different mechanisms for operating the valve closure member may be used and any form of valve closure member may be used, provided it will result in spreading the fluid into substantially a tubular stream, as hereinafter described. Otherwise, the structure of and means for operating the valve closure member may be as desired and a very simple form of structure and operating means has been selected for illustration and description in order to show a complete, operative valve structure.

In the illustrated embodiment, casing 1 is generally cylindrical in form but at one end it circularly tapers into front, or intake, orifice 2, at which orifice the casing carries valve-seat ring 3, affixed to casing 1 in any suitable manner as by bolts 4.

Within, and coaxially with, casing 1 is positioned the valve carrying core comprising the outer shell 5, the base 6, the central guide 7 and bearing 8.

Splitters, detailed at Fig. 5, are positioned between the casing 1 and shell 5 and are preferably cast integral therewith, whereby the splitters support the valve carrying core within and coaxially with casing 1.

The splitters have sharp inner edges 9 extending from the front of shell 5 to the forward terminal 10 of the splitter and flare rearwardly from terminal 10 and outwardly from edge 9. Toward the rear, the splitters are divided into prongs 11 and 12, having ports 13 adjacent shell 5, all as clearly illustrated at Fig. 5.

The casing 1 is cut away opposite the space between prongs 11 and 12, as at 14, so as to provide for free movement of air from without the casing 1, through cut-away 14, through the space between the prongs 11 and 12 and through ports 13 to the space surrounding shell 5.

Carried by the core, above described, is the valve adapted to cause the fluid to be spread as hereinafter described and which, in this embodiment, has head 15, a depending skirt 16, which longitudinally slidingly engages shell 5 with a substantially fluid tight fit and a depending central guide 17 adapted to slidingly engage guide 7. Guide 17 is secured against rotation relative to guide 7, as by key 18 slidable in keyway 19 in guide 7.

Guide 17 is provided with a head 20, bored and threaded to receive screw 21 which has a collar 22 seated on the central portion of base 6, and a shaft 23 journaled in said central portion of base 6 and extending therebeyond into non-rotatable interengagement with beveled gear 24, which may be secured to shaft 23 by nut 25. Gear 24 meshes with gear 26, which is affixed, as by pin 27, to the end of shaft 28 journaled in bearing 8 and provided with crank 29, whereby screw 21 may be rotated to reciprocate the valve closure member to and between open position illustrated at Fig. 1 and closed position illustrated at Fig. 2.

It will be understood that the fluid enters the valve from the left, at Fig. 1, so that the closing movement of the valve is against the pressure of the fluid and any suitable provision may be made for balancing the valve. Balance, in this embodiment, is effected by port 30 in the point of the valve head and port 31 in the wall of guide 17, whereby open communication is established between the fluid flowing against head 15 and the variable sized chamber within shell 5, base 6, head 15 and skirt 16, and thereby substantially balances the valve, so that it may be readily reciprocated by the means already described.

This invention has to do with the formation and control of the fluid stream passing through, and its emission from, the valve; and, accordingly, any suitable means may be used for spreading the fluid and for reciprocating the valve closure member including the balancing thereof, and the spreading and operating structures and means illustrated in the drawing and hereinabove described, are merely indicative.

It will be noted, however, that the splitters provide a safe and convenient location for such of the operating mechanism as extends from the central portion to the exterior of the complete assembly. This is illustrated by the position of shaft 28 at the end of a splitter and between the prongs thereof in which position the shaft, while extending from the central portion of the structure to the exterior, is wholly protected from the flowing fluid by the splitter alone, as clearly illustrated especially at Figs. 3 and 5.

It will be understood that valves of this class are primarily intended for use under such volumes and pressures that the fluid will flow through the structure under substantially the same conditions as to speed and pressure at the top as at the bottom, at least so far as concerns the problems of control here involved.

The present invention being primarily concerned with the control of fluid flowing through and being emitted from the structure, Fig. 1, in which the valve is open, will be referred to in describing the control of the flow.

Fluid entering through intake orifice 2 strikes head 15 and is thereby flared or spread outwardly toward casing 1 and passes through and beyond the annular space, between the periphery of head 15 and casing 1, in the form of a tubular stream against and confined by the casing 1, which continues to flare outwardly to a point somewhat beyond head 15, whence, to the discharge end, the casing follows substantially cylindrical lines, all as clearly illustrated by the inner and outer flow contour lines 32 and 33 respectively on Figs. 1 and 3.

This tubular stream is, however, separated into segments by the splitters, as clearly illustrated at Fig. 3, so that it is emitted from the discharge end of the structure in a segmental tubular stream.

The periphery of head 15 is preferably formed into an overhanging, relatively sharp edge as at 15a, which formation aids in making a sharply defined inner surface 32 of the tubular stream.

Because of the increased diameter of the casing and/or the increased speed of the flow resulting from elimination of back pressure by release of the stream at the discharge end, the segmental stream within the casing will not fill the space between the casing and shell 5, wherefore cavitation would result but for the admission of air to the space surrounding shell 5. Air is admitted to this space both through cutaway 14 and ports 13 and through the spaces beyond the splitters in the emitted stream, through which spaces air enters the hollow core of the emitted stream behind the base 6 and thence is freely admitted to the space around shell 5. Thus cavitation is prevented around shell 5 and skirt 16 as well as behind base 6.

The desirability of emitting a reasonably confined stream or jet, while avoiding the recognized objections to a solid stream, is well understood by those skilled in the art, as is also the necessity of avoiding cavitation.

It will be obvious to those skilled in the art that these long existing needs are met by the present invention.

While many details of construction are illustrated in the drawing and herein described, many alternative equivalent structures and means will occur to those skilled in the art, all of which are within the scope and spirit of the foregoing description and the appended claims and this specification and claims are not to be limited to the structures used for illustration and described.

I claim:

1. A valve structure having a casing adapted to receive fluid through a relatively small orifice at one end and emit the fluid from a relatively large cylindrical body portion, a valve-carrying core annularly spaced from the casing, the inner wall of the casing enlarging along curved lines from said orifice to mergence with said cylindrical body portion and means for spreading the received fluid into a substantially tubular stream flowing continuously along the inner wall of the casing.

2. In combination with a valve structure as defined in claim 1, means for admitting air to the annular space within the tubular stream.

3. In combination with a valve structure as defined in claim 1, air conduits passing through the wall of the tubular stream and intercommunicating between the annular space within the tubular stream and the atmosphere without the casing.

4. In a valve structure as defined in claim 1, the casing having a fluid intake orifice of less circumference than the maximum circumference of the spreader means and flaring from the intake orifice to its largest circumference in a plane beyond the plane of maximum circumference of the spreader means.

5. In a valve structure as defined in claim 1, means for maintaining the fluid during its passage through the casing in such substantially tubular stream, annularly spaced from said core.

6. In combination with a valve structure as defined in claim 1, splitters tapered toward said spreader means and extending inwardly from the casing toward said core whereby to divide said tubular stream into segments.

7. In a valve structure as defined in claim 1, splitters dividing into segments the annular space between the core and the casing and means associated with the splitters for admitting air through said tubular stream into the annular space adjacent the core.

8. In a valve structure a casing having an intake orifice and flaring therefrom into a relatively large cylindrical body which continues to the discharge end, a valve-carrying core within and annularly spaced from said body, means associated with the core for spreading into a substantially tubular stream, annularly spaced from the core, fluid entering the intake orifice, said spreader means being normally positioned between the cylindrical portion and the intake orifice of the casing.

9. In a valve structure as defined in claim 8, the spreader means having a substantially sharp edge at its maximum circumference.

10. In a valve structure as defined in claim 8, splitters within, and extending beyond the discharge end of the casing adapted to divide and discharge the tubular stream segmentally.

11. In a valve structure as defined in claim 8, splitters within, and extending to the discharge end of the casing adapted to divide and discharge the tubular stream segmentally, said splitters having associated therewith means for admitting air from without the casing through the splitters to the annular space adjacent the core.

12. In a valve structure having a generally cylindrical casing and a valve-carrying core within and annularly spaced from the casing and means for spreading fluid into a substantially tubular stream flowing through said annular space, splitters in said annular space having an inwardly positioned edge and flaring outwardly therefrom to the casing and forwardly terminating in a point and flaring backwardly therefrom longitudinally of the casing.

13. In a valve structure as defined in claim 12, the splitters being provided with interior air chambers and ports between said chambers and the space within the tubular stream.

14. In a valve structure having a cylindrical casing and a valve carried by a core, which is within, spaced from and concentric with the casing, means for emitting from said casing a substantially tubular but segmental stream, valve operating means without said stream and extending between segments of the stream and adapted to operate said valve within said tubular stream.

BYRON H. STAATS.